United States Patent [19]

Mauro

[11] Patent Number: 4,741,682
[45] Date of Patent: May 3, 1988

[54] TIRE MOLDING PRESS
[75] Inventor: Roberto Mauro, Rome, Italy
[73] Assignee: The Firestone Tire & Rubber Company, Akron, Ohio
[21] Appl. No.: 71,673
[22] Filed: Jul. 9, 1987

[30] Foreign Application Priority Data

Jul. 17, 1986 [IT] Italy ............................... 67578 A/86

[51] Int. Cl.⁴ .......................................... B29C 35/00
[52] U.S. Cl. .................................... 425/28.1; 425/32; 425/38
[58] Field of Search ................... 425/28 R, 34 R, 32, 425/33, 38

[56] References Cited

U.S. PATENT DOCUMENTS

| | | | |
|---|---|---|---|
| 2,343,881 | 3/1944 | Brundage | 425/34 R |
| 2,730,763 | 1/1956 | Brundage | 425/33 |
| 2,927,343 | 3/1960 | Soderquist | 425/38 |
| 3,041,667 | 7/1962 | Harris | 425/34 R |
| 3,065,499 | 11/1962 | Brundage et al. | 425/32 |
| 3,065,503 | 11/1962 | Mallory et al. | 425/38 |
| 3,097,394 | 7/1963 | Mallory et al. | 425/38 |
| 3,141,191 | 7/1964 | Soderquist | 425/38 |
| 3,267,515 | 8/1966 | Ulm | 425/38 |
| 3,378,882 | 4/1968 | Turk et al. | 425/38 |
| 3,522,626 | 8/1970 | Balle | 425/38 |
| 3,734,656 | 5/1973 | Balle | 425/34 R |
| 3,854,852 | 12/1974 | Carter | 425/28 R |
| 3,932,079 | 1/1976 | Legostaev et al. | 425/32 |
| 4,385,027 | 5/1983 | Nakagawa et al. | 425/38 |
| 4,452,766 | 6/1984 | Sheerer et al. | 425/38 |

Primary Examiner—Willard Hoag
Attorney, Agent, or Firm—Ernst H. Ruf

[57] ABSTRACT

A tire molding press having a fixed bed and a crosspiece, which crosspiece is designed to travel, by virtue of a crank mechanism, along vertical guides formed partly along the uprights and partly along extensions of the same; the guide portions extending along the upright extensions enabling extra vertical travel of the crosspiece, and each being limited at the rear by a switch element which may be operated selectively for opening the respective guide at the rear and enabling the upper end of the respective connecting rod to slide backwards, with the crank fixed, and along an end surface of the respective upright, in such a manner as to tilt back the crosspiece.

7 Claims, 4 Drawing Sheets

TIRE MOLDING PRESS

TECHNICAL FIELD

The present invention relates to a tire molding press.

BACKGROUND OF THE INVENTION

For molding and curing green tires, presses are known to be employed comprising a fixed bed designed to receive, on top, at least a bottom mold for a green tire, and having two substantially vertical, lateral uprights, on each of which there is formed a substantially vertical slot open at the top. The said two slots define the slideways of a crossbar constituting a common slide for two crank mechanisms, each connected to one of the said uprights. The connecting rod of each of the said crank mechanisms is of such a length that the said slide moves over the top end of the said slots when the connecting rods reach the top dead center position.

The said slide supports, in rotary manner, a crosspiece located between the said two uprights and fitted with at least a top mold for a green tire. The said crosspiece is connected integral with two appendixes (sliding shoes), the free end of each of which engages a substantially vertical guide formed on a respective upright and arranged in such a manner that its top end is reached by its respective appendix after the said slide reaches the top end of the respective said guides, and before the connecting rods of the said two crank mechanisms reach the top dead center position.

Clearly, therefore, when the crosspiece on the press is pushed up by the two crank mechanisms for opening the mold, the crosspiece is moved upwards until the said two appendixes reach the top end of the respective guides. Further rotation of the cranks, beyond this point, causes the slide to slide backwards along supports formed on top of the uprights, and, at the same time, tilts the crosspiece back about the slide axis. As a result, the mold on the crosspiece turns upwards, thus enabling full access for removing the molded tire. Such backward tilting of the crosspiece occurs as soon as the slide moves over the top of the uprights, and is caused by the tiltback torque produced by the combined effect of the slide sliding backwards by gravity along the said supports formed on top of the uprights, and the said appendixes on the crosspiece engaging inside the respective guides.

Though widely used for molding tires, presses of the aforementioned type involve a number of both functional and structural drawbacks. Tilting back the crosspiece on the press for enabling access to and removing the molded tire(s) is not only a relatively time-consuming operation, which consequently slows down production, but also subjects the press itself to tiltback moments directly proportional to the weight of the molds involved. These moments, which are caused by rearward displacement of the center of gravity of the crosspiece in relation to the bed, are grounded through the bolts anchoring the bed to the floor, with the result that the bolts must be continually inspected and have a relatively short working life. The aim of the present invention is to provide a tire molding press involving none of the aforementioned drawbacks.

DISCLOSURE OF THE INVENTION

With this aim in view, according to the present invention, there is provided a tire molding press comprising a fixed bed; two uprights extending upwards from the said bed; a crosspiece mounted in such a manner as to travel along the said uprights; and a crank mechanism for driving the said crosspiece to and from the said bed, the said crank mechanism comprising a slide connected to the said crosspiece, and first substantially vertical guide means, for the said slide, extending upwards from the said bed; characterized by the fact that each said upright presents, at the top end, second substantially horizontal guide means for the said slide, and a substantially vertical extension; the said first guide means comprising a first guide portion extending along each said upright, and a second guide portion extending along each said extension; and switch means being provided for placing each said first guide portion selectively in communication with the respective said second guide portion and with the said second guide means.

According to a preferred embodiment of the invention as described above, the said crosspiece is connected, in rotary manner, to the said slide, in such a manner as to turn, in relation to the slide itself, about a substantially horizontal axis; securing (angle control) means being provided for angularly securing or controlling the said crosspiece to the said slide during displacement of the said slide along the said first and second guide portions.

The said securing (angle control) means preferably comprise third substantially vertical guide means, and slide means mounted so as to slide along the said third guide means and connected integral with the said crosspiece; the said first and the said third guide means being of substantially the same length and offset in height.

BRIEF DESCRIPTION OF THE DRAWINGS

One embodiment of the present invention will be described by way of a non-limiting example, with reference to the accompanying drawings, in which.

BEST MODE FOR CARRYING OUT THE INVENTION

Figure 1:
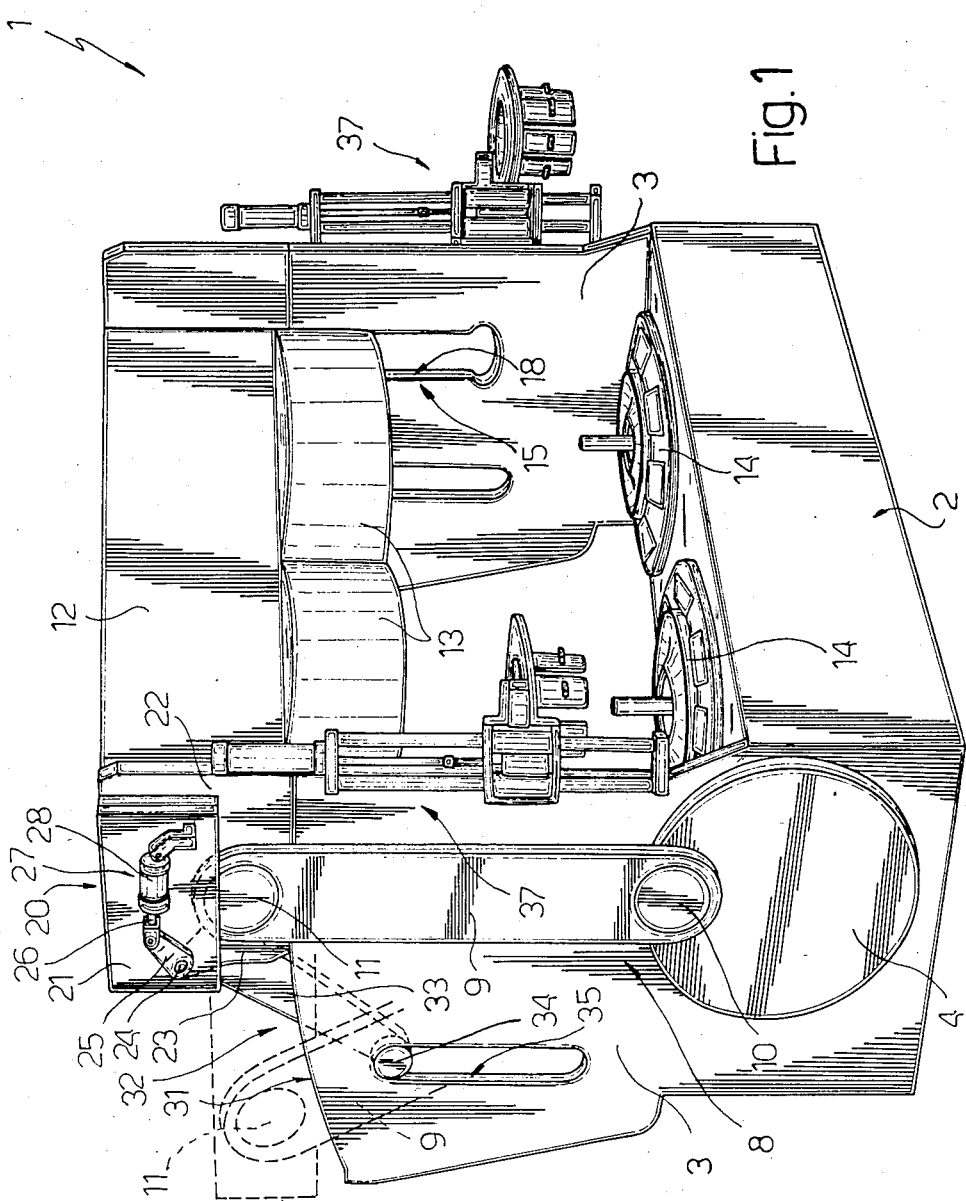
FIG. 1 shows a view in perspective of a preferred embodiment of the press according to the teachings of the present invention.

Number 1 in FIG. 1 indicates a tire molding and curing press comprising a substantially parallelepiped bed 2 from the opposite side ends of which there extend upwards two uprights 3.

On the outside of each upright 3, bed 2 supports, in rotary manner, a circular crank 4 fitted onto a center shaft (not shown). The said shaft is arranged substantially horizontally inside bed 2, in such a manner as to connect the said two cranks 4, and is connected to an output member (not shown) of a reduction device 5 driven by an output shaft 6 on motor 7.

Cranks 4 form part of a crank mechanism indicated as a whole by 8 and comprising, for each crank 4, a connecting rod 9, the lower end of which is hinged onto a crank pin defined by a substantially horizontal, eccentric pin 10 on respective crank 4, and the upper end of which is fitted with a slide 11 consisting of a substantially horizontal shaft connecting the said two connecting rods 9.

Press 1 also comprises a crosspiece 12 mounted for rotation on slide 11 and supporting two top molds 13, the respective bottom molds 14 of which are fixed on bed 2. According to an obvious variation (not shown), slide 11 consists of two coaxial pins connected, in rotary manner, to the top end of respective connecting rods 9 and integral with the opposite lateral ends of crosspiece 12.

When moved to and from bed 2 by crank mechanism 8, slide 11 is guided by substantially vertical slots 15 engaged by respective cylindrical bushings integral with slide 11 and each defining a sliding shoe 16. Each slot 15 comprises a lower portion 18 formed along respective upright 3, and an aligned upper portion 19 extending along an extension or appendix 20 extending substantially vertically from the top of the said upright 3.

Figure 2:
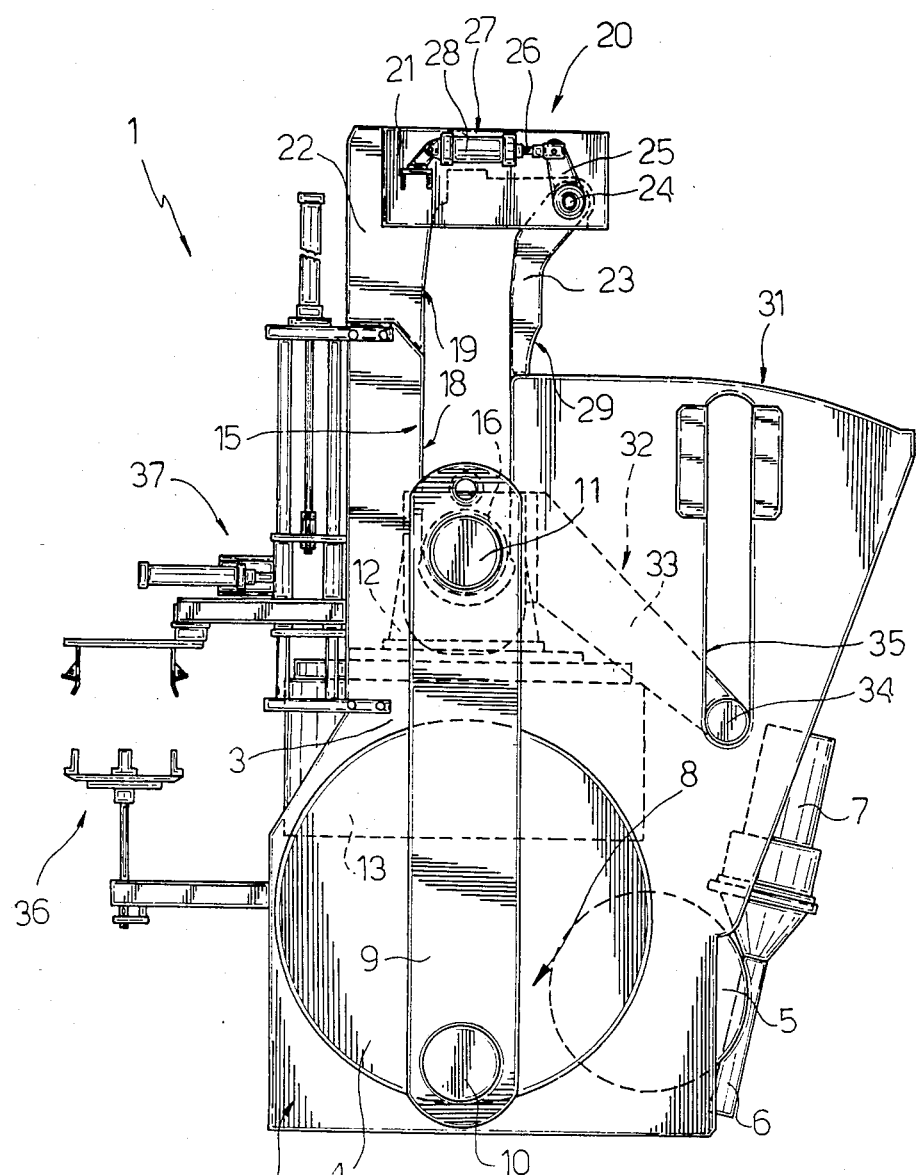
FIGS. 2, 3 and 4 show side views of the FIG. 1 press in three distinct operating positions.
Figure 4:
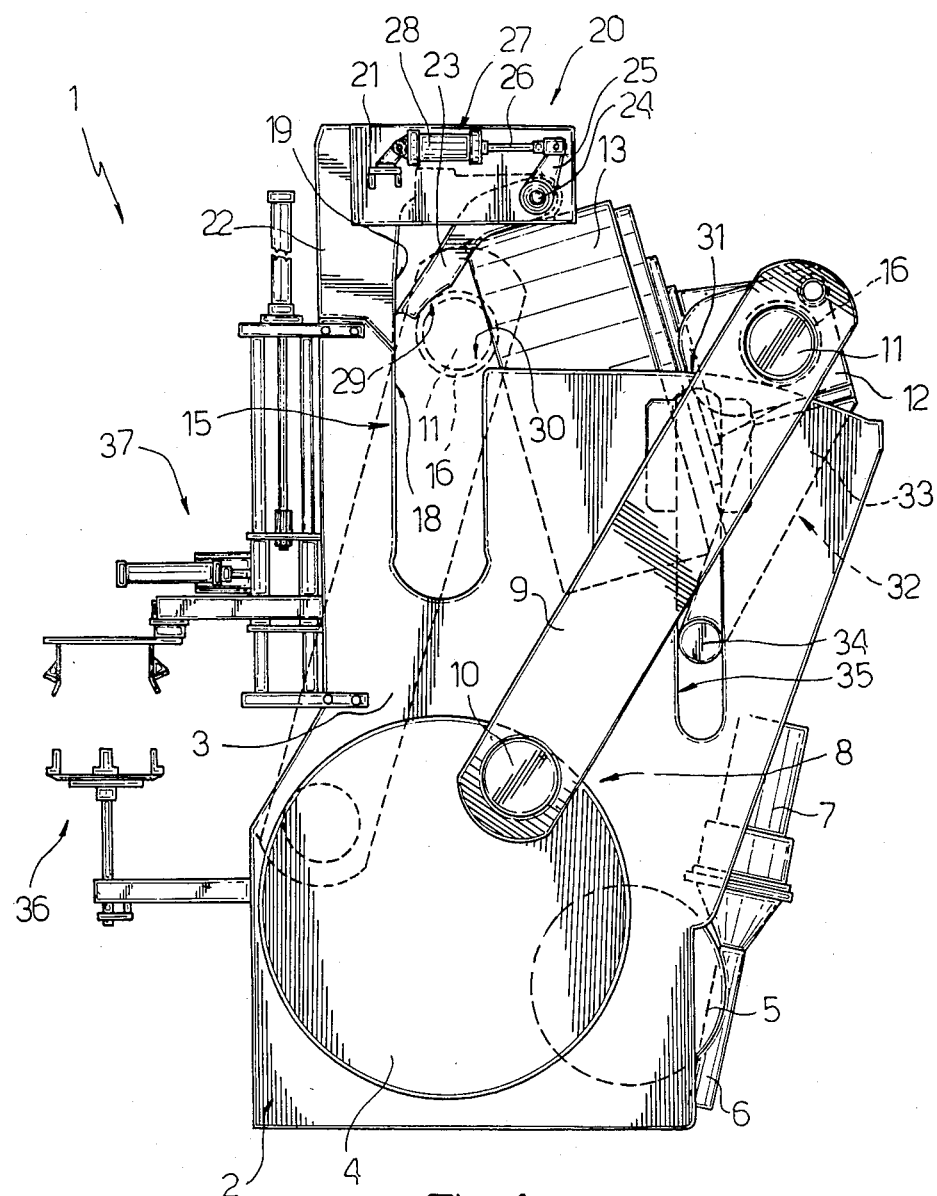

As shown, particularly in FIGS. 2 and 4, each appendix 20 is substantially in the form of an upside-down "U" and comprises a horizontal top plate 21, from which there extend downwards a substantially vertical front arm 22 connected integral with the top of respective upright 3, and a rear arm 23 hinged, at its top end, to a substantially horizontal pin 24 on plate 21. To the top of arm 23, there is connected an appendix 25, to the free end of which is hinged the free end of a rod 26 of an air-powered jack 27, the body 28 of which is supported on plate 21.

Arm 23 constitutes a switch member which, when set in a normal first operating position substantially parallel with arm 22, and defines, with arm 22, the said upper portion 19 of respective slot 15. When, on the other hand, subsequent to operation of air-powered jack 27, arm 23 is turned about the axis of pin 24 towards arm 22, the arched rear side edge 29 of arm 23 moves into a position substantially tangent with the rear side edge of arm 22. In this position, arm 23 defines an opening 30, passing through which respective shoe 16 may leave the said lower portion 18 of respective slot 15 and move over the top of respective upright 3 in sliding contact with a curved surface 31 defining the top end of respective upright 3 and extending substantially transversely in relation to the axis of slot 15.

Figure 3:
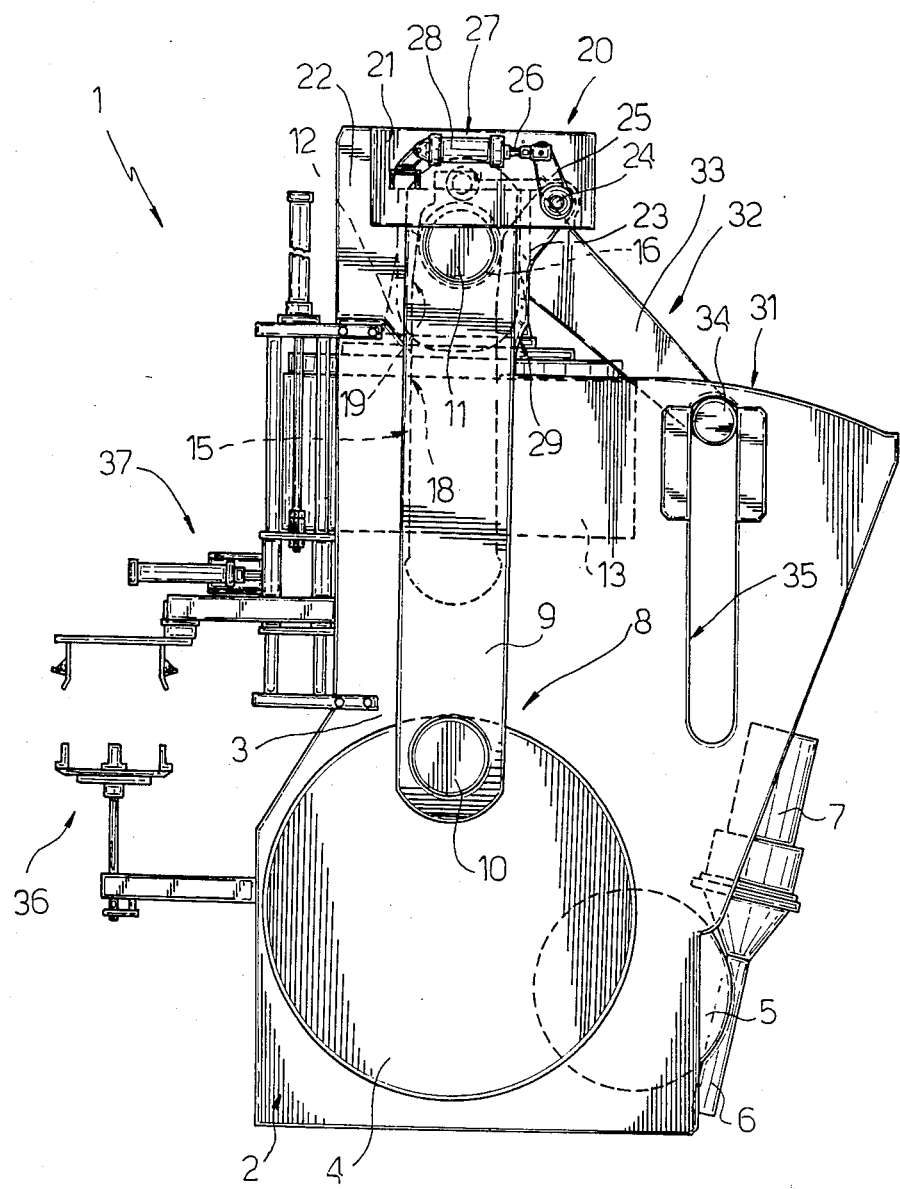

As shown, particularly in FIGS. 2 and 3, crosspiece 12 presents an angle control device 32 designed to control the angle of crosspiece 12 in relation to slide 11. Device 32 comprises two downward-sloping arms 33 extending rearwards from a rear surface of crosspiece 12 and each fitted, on its free end, with a respective horizontal pin 34. Each pin 34 engages, in rotary and transversely sliding manner, a respective slot 35 formed along respective upright 3, parallel with respective slot 15, and of substantially the same length as slot 15. Each slot 35 on respective upright 3 is offset downwards in relation to respective slot 15, so that, when slide 11 occupies the lower end of slots 15, pins 34 occupy the lower ends of respective slots 35.

As shown, particularly in FIGS. 2, 3 and 4, to the front of each bottom mold 14, bed 2 supports a device 36 for supporting an unmolded tire (not shown) and is designed to cooperate with a known type of automatic device 37 for feeding the said tire onto the said bottom mold 14.

Operation of press 1 will now be described starting from the closed molding position shown in FIG. 2.

Starting from the said closed molding position, press 1, after allowing sufficient time for molding and curing the tires, is opened for enabling the finished tires to be unloaded. For this purpose, motor 7 is operated for turning cranks 4 and pushing up crosspiece 12 and top molds 13 connected to it.

Unlike known presses, on which the required clearance between top molds 13 and bottom molds 14 for removing the finished tires is achieved by raising and subsequently tilting up and back crosspiece 12 and top molds 13 connected to it, on press 1, the said clearance is achieved by maintaining arm 23 in the normal closed position shown in FIGS. 2 and 3, and by moving connecting rods 9 into the top dead center position. During such displacement of connecting rods 9, slide 11 not only slides along the entire lower portion of slots 15, but also travels an extra vertical distance along the entire upper portion 19 of slots 15. At the same time, pins 34 of control device 32 shift from the lower end to substantially the upper end of respective slots 35, thus maintaining crosspiece 12 at a fixed angle in relation to slide 11.

The increased clearance between top and bottom molds 13 and 14 provided, on press 1, by the extra travel of slide 11 along upper portions 19 of slots 15 enables the finished tires to be unloaded and further tires to be loaded with no need for tilting back crosspiece 12 and top molds 13 connected to it. As a result, tires may be loaded and unloaded relatively quickly, and with no undue strain being exerted on the fasteners securing bed 2 to the floor. The same does not apply, however, if the molds are to be changed after unloading the finished tires. In fact, changing top molds 13 would prove fairly difficult with crosspiece 12 in the non-tilted position shown in FIG. 3. For changing the molds, therefore, arm 23 is moved by jack 27 into the open position shown in FIG. 4, prior to raising crosspiece 12 by means of crank mechanism 8. By so doing, slide 11 reaches openings 30 as pins 10 approach the top dead center position. Further rotation of cranks 4 causes shoes 16 to move through respective openings 30, and then both shoes 16 and slide 11 to slide by gravity along surfaces 31.

Shoes 16 continue sliding until, as shown in FIG. 4, connecting rods 9 exceed top dead center and line up with the rotation centers of respective cranks 4. As shoes 16 slide along respective substantially horizontal supporting surfaces (or guide means) 31, crosspiece 12 moves backwards towards slots 35. As a result, pins 34 are forced to slide down inside respective slots 35, thus causing crosspiece 12 and top molds 13 connected to it to turn upwards about the axis of slide 11. As shown in FIG. 4, when shoes 16 come to the end of their travel along supporting surfaces 31, top molds 13 are tilted roughly 90 degrees in relation to their original vertical position, thus enabling them to be changed easily. In other words, therefore, the switch member consisting of mobile rear arm 23 on appendix 20 provides, when set to the open position, for operating press 1 in the same way as a known press, but only for changing the molds. For normal molding operation, on the other hand, arm 23 is set in the vertical closed position, and not only prevents crosspiece 12 and top molds 13 connected to it from being tilted back, but also enables crosspiece 12 to travel an extra vertical distance in an extremely short space of time, thus enabling troublefree unloading of the finished tires, without introducing tiltback moments resulting in anomalous strain on the fasteners securing bed 2 to the floor.

From the foregoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes or the like without departing from the spirit and scope of the invention with the latter being determined solely by reference to the claims appended hereto.

What is claimed is:

1. A tire molding press comprising a fixed bed; two uprights extending upwards from the said bed; a crosspiece mounted in such a manner as to travel along the said uprights; and a crank mechanism for driving the said crosspiece to and from the said bed, the said crank mechanism comprising a slide connected to the said crosspiece, and first substantially vertical guide means, for the said slide, extending upwards from the said bed; wherein each said upright presents, at the top end, second substantially horizontal guide means for the said slide, and a substantially vertical extension of said vertical guide means above said horizontal guide means; the said first guide means comprising a first guide portion extending along each said upright, and a second guide portion extending along each said extension; and switch means being provided for placing each said first guide portion selectively in communication with the respective said second guide portion and with the said second guide means.

2. A press as claimed in claim 1, wherein the said crosspiece is connected to the said slide in such a manner as to turn about the axis of the same; angle control means being provided for angularly securing the said crosspiece in relation to the said axis during displacement of the said slide along the said first and the said second guide portion.

3. A press as claimed in claim 2, wherein the said angle control means comprise third substantially vertical guide means, and slide means mounted in such a manner as to slide along the said third guide means and connected integral with the said crosspiece; the said first and the said third guide means being of substantially the same length and offset in height.

4. A press as claimed in claim 3, wherein the said first and the said third guide means respectively comprise a first and a second slot formed on each said upright and extending substantially vertically; each said first slot extending along the respective said upright and along the respective said extension.

5. A press as claimed in claim 4, wherein each said second slot is offset downwards in relation to the respective said first slot; the said angle control means comprising two arms integral with the said crosspiece and extending downwards from the same; and each said arm presenting a transverse pin engaged, in rotary and transversely-sliding manner, inside a respective said second slot.

6. A press as claimed in claim 1, wherein said extension of each said upright is substantially in the form of an upside-down "U", and comprises a fixed front arm and a rear arm designed to turn about its top end; the said rear arm constituting the said switch means, and actuating means being provided for moving the said rear arm between a normal substantially vertical closed position parallel with the respective said front arm, and an open position wherein the said rear arm defines, in the respective said extension, a lateral opening enabling communication between the upper end of the respective said lower portion of the said first guide means and the said second guide means; the said lateral opening being of such a width as to at least enable passage of the said slide.

7. A press as claimed in claim 6, wherein the said second guide means are defined by an upper surface of each said upright; the said slide being provided with shoes for enabling it to slide on the said upper surfaces.

* * * * *